UNITED STATES PATENT OFFICE.

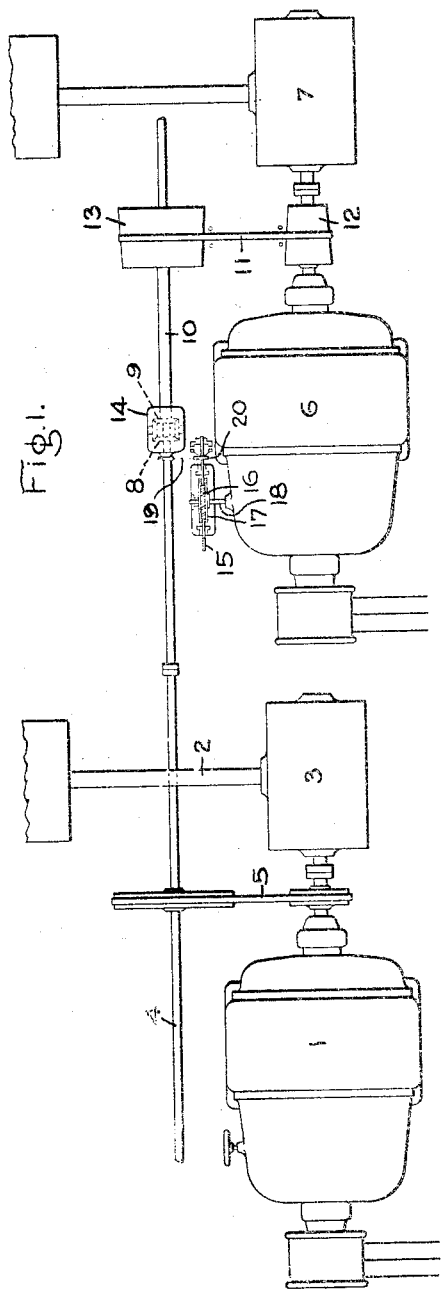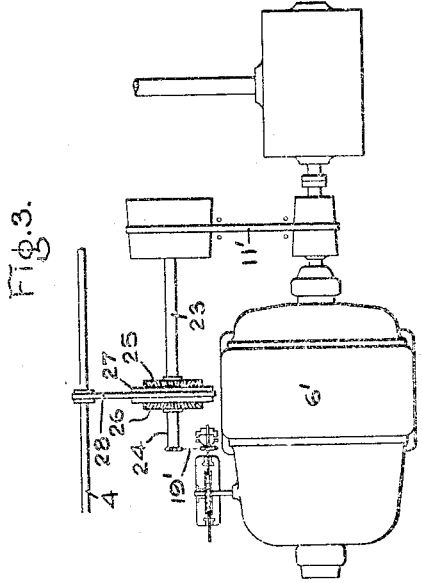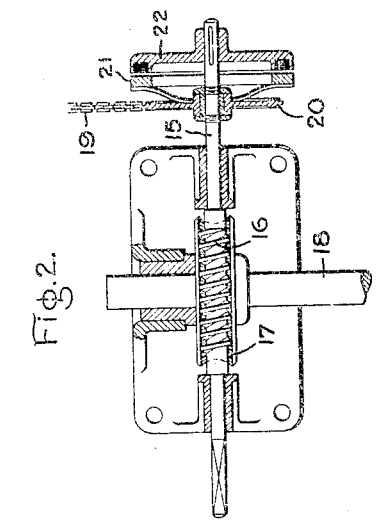

NEWTON SHUTTLEWORTH, OF RUGBY, ENGLAND, ASSIGNOR TO GENERAL ELECTRIC COMPANY, A CORPORATION OF NEW YORK.

SEGREGATED DRIVE FOR PAPER-MACHINES AND THE LIKE.

1,362,359. Specification of Letters Patent. Patented Dec. 14, 1920.

Application filed September 2, 1920. Serial No. 407,735.

*To all whom it may concern:*

Be it known that I, NEWTON SHUTTLEWORTH, a subject of the King of Great Britain, residing at Rugby, county of Warwickshire, England, have invented certain new and useful Improvements in Segregated Drives for Paper-Machines and the like, of which the following is a specification.

My invention relates to segregated driving mechanism for paper machines and the like, wherein a plurality of sections are required to run in fixed but adjustable speed relationship. With such machines, it is usual to provide a number of motors such as steam engines or electric motors, each of which drives a separate section of the machine. Owing to the shrinkage of the paper and other causes, the speeds of the different sections of the machine require individual adjustment to accommodate the different conditions of operation. When once properly adjusted, the driving motors must be regulated to maintain the speed relationship fixed with a high degree of accuracy.

My invention will be better understood from the following description taken in connection with the accompanying drawings, and its scope will be pointed out in the appended claim.

Referring to the accompanying drawings, Figure 1 is a diagrammatic plan view of the driving mechanism of a part of the paper machine, the driving motor being represented as an alternating current commutator motor; Fig. 2 is an enlarged detail view of the mechanism for transmitting motion to the brush shifting mechanism of the automatically regulated motors; and Fig. 3 represents an alternative arrangement of parts.

In Fig. 1, 1 represents an alternating current commutator motor which drives a section of the machine through the main shaft 2, power being transmitted from the motor to the shaft through suitable gearing which may, for example, comprise a worm and worm wheel inclosed in the casing 3. A master shaft 4 extends throughout the paper machine, and in my improved arrangement this master shaft is arranged so as to be parallel to the shafts of the various section driving motors. In the arrangement shown the master shaft 4 is driven from the motor 1 in any convenient manner. The arrangement of parts permits of a simple belt gearing 5 running over pulleys chosen to give any desired speed ratio between the motor 1 and the master shaft 4. As thus arranged the motor 1 acts as a master motor furnishing a control speed for the other section driving motors as will be hereinafter set forth. A second motor 6 is shown as driving an adjacent section of the machine through gearing contained in the casing 7. The motor 6 is provided with any suitable means for automatically regulating its speed. In Fig. 1 alternating current commutator motors are illustrated and the regulating mechanism will in this case comprise mechanism for shifting the position of the brushes on the commutator. It is to be understood, however, that my invention is not in its broadest aspect limited to the use of alternating current motors. The regulating mechanism for the motor 6 is duplicated at each of the other sections of the machine, not shown. This regulating mechanism is operated by a differential mechanism comprising a gear 8 mounted upon the master shaft 4 and a gear 9 mounted upon a sleeve or quill 10 arranged to rotate about the master shaft 4. The sleeve 10 is driven from the shaft of motor 6 by means of a belt 11 passing over cone pulleys 12 and 13 mounted respectively on the motor shaft and on the sleeve 10. These cone pulleys are designed to give the desired speed ratio, and this speed ratio may be adjusted slightly by shifting the belt 11 along the cone pulleys by any well known belt shifting mechanism. A belt tightener may be used to keep the belt taut when necessary. The planet of the differential mechanism is mounted in a casing 14. The casing 14 is arranged to be connected to transmit its motion to shaft 15 which carries a worm 16, shown more clearly in Fig. 2. This worm meshes with a worm wheel 17 adapted, when rotated, to adjust the position of the brushes on the commutator of the motor in one direction or the other to increase or decrease the speed of the motor. This brush shifting mechanism may consist, for example, of a pair of racks with which a pinion carried by shaft 18 meshes so that when the shaft is rotated the racks are moved in opposite directions to shift the brushes. In the arrangement shown, motion is transmitted from casing 14 to shaft 15 through a chain 19 engaging a sprocket-wheel mounted on casing 14 and a sprocket-wheel 20 loosely mounted on shaft 15 so that when the motor 6 is not in operation this sprocket-wheel may rotate freely without transmitting motion to the shaft 15. Any suitable clutch may be employed to connect the sprocket-wheel 20 to the shaft 15, this clutch being represented as an electromagnetic clutch having one member 21 secured to the sprocket-wheel 20 and the other member 22 mounted on a feather on shaft 15. I prefer to use a motor having a shunt characteristic so that any definite brush position will be associated with a known running speed.

The operation of the arrangement shown in Fig. 1 is as follows: If the master motor 1 be running at the desired speed and all the other motors which have to be regulated relatively to it are stationary then the shaft of motor 6 is stationary and also the sleeve 10, although the master shaft 4 is rotating the gear 8 and thereby causing rotation of the differential casing 14. This causes the chain 19 to rotate the sprocket-wheel 20, but as the clutch is not energized, this wheel rotates freely on shaft 15, the brush shifting mechanism remaining unaffected. The brush gear can be set by hand to any desired position by turning the shaft 15. When the circuit is closed motor 6 commences to rotate thereby accelerating the sleeve 10 and gear 9 and decelerating the casing 14. When the motor has reached the proper speed casing 14 will be stationary and the clutch may be energized connecting sprocket-wheel 20 to shaft 15. Any tendency of motor 6 to depart from the correct speed, as determined by the master shaft 4 will result in a movement of the differential casing 14 and a corresponding operation of the brush shifting mechanism in a direction to correct the speed variation. For example, if the load on any motor increases, the motor will tend to decrease in speed and the master shaft will momentarily rotate faster than the sleeve 10 but the resultant movement of the differential casing 14 will at once adjust the position of the motor so as to increase its speed until the desired speed relation is restored. If it be desired to vary the speed relationship of motor 6 to the remaining motors, this may be done by shifting the belt 11 along the cone pulleys 12 and 13 thus causing a change in the speed ratio between motor 6 and sleeve 10. This change in speed ratio will cause an operation of the brush shifting mechanism to change the speed of motor 6 by an amount sufficient to bring the differential casing 14 to rest with the new speed ratio.

In the arrangement shown in Fig. 3, instead of having one member of the differential gear carried by the master shaft and the other on a sleeve surrounding the master shaft, I provide a countershaft 23 driven by means of a belt 11' and cone pulley speed adjusting device from the motor 6'. In line with countershaft 23, I provide a second countershaft 24 and provide gears 25 and 26 on the adjacent ends of these countershafts. The planet 27 of the differential gear is arranged to be driven by means of a belt or chain 28 from the master shaft 4. The countershaft 24 is connected by means of a chain 19' with brush shifting gear of the motor in the manner described in connection with the arrangement shown in Figs. 1 and 2.

The operation of the arrangement shown in Fig. 3 will be clear from the preceding description. It will be seen that if the shaft 23 is driven by motor 6' at twice the speed at which the planet 27 is driven by the master shaft 4, the shaft 24 will remain stationary. So long as the relationship between the speed of shaft 23 driven by the motor and planet 27 driven by the master shaft remain the same, shaft 24 will remain stationary and no movement of the brush shifting mechanism will take place. Should, however, the speed of shaft 23 increase or decrease, shaft 24 will immediately begin to rotate in one direction or the other thereby altering the position of the brushes to increase or decrease the speed of the motor so that it will again drive shaft 23 at twice the speed at which the casing is being driven by the master shaft, thus bringing the shaft 24 to rest.

It is apparent that the speed of the paper machine, as a whole, may be increased or decreased by varying the speed of the master shaft 4 by manually adjusting the position of the brushes of motor, where, as in the arrangement shown, this master shaft is driven by one of the section driving motors. It is apparent, however, that if desired the master shaft may be driven by a motor which has no other load imposed thereon, as is well known in the art.

What I claim as new and desire to secure by Letters Patent of the United States, is,—

A segregated drive for paper machines and the like wherein a plurality of sections are required to run in fixed but adjustable speed relationship, comprising a motor arranged to drive each section, means for controlling the speed relationship of the driving motors comprising a master speed controlling shaft arranged parallel to the shafts of the section driving motors, regulating means for controlling the speed of each of a plurality of said motors, and differential mechanism for controlling the operation of each regulating means comprising a gear mounted upon the master shaft and a gear mounted upon a sleeve rotatable about said master shaft, and speed adjusting means for driving each sleeve from the corresponding motor shaft.

In witness whereof, I have hereunto set my hand this tenth day of August, 1920.

NEWTON SHUTTLEWORTH.

Witnesses:
J. A. FOSTER,
DOROTHY WHITE.